Patented Jan. 28, 1941

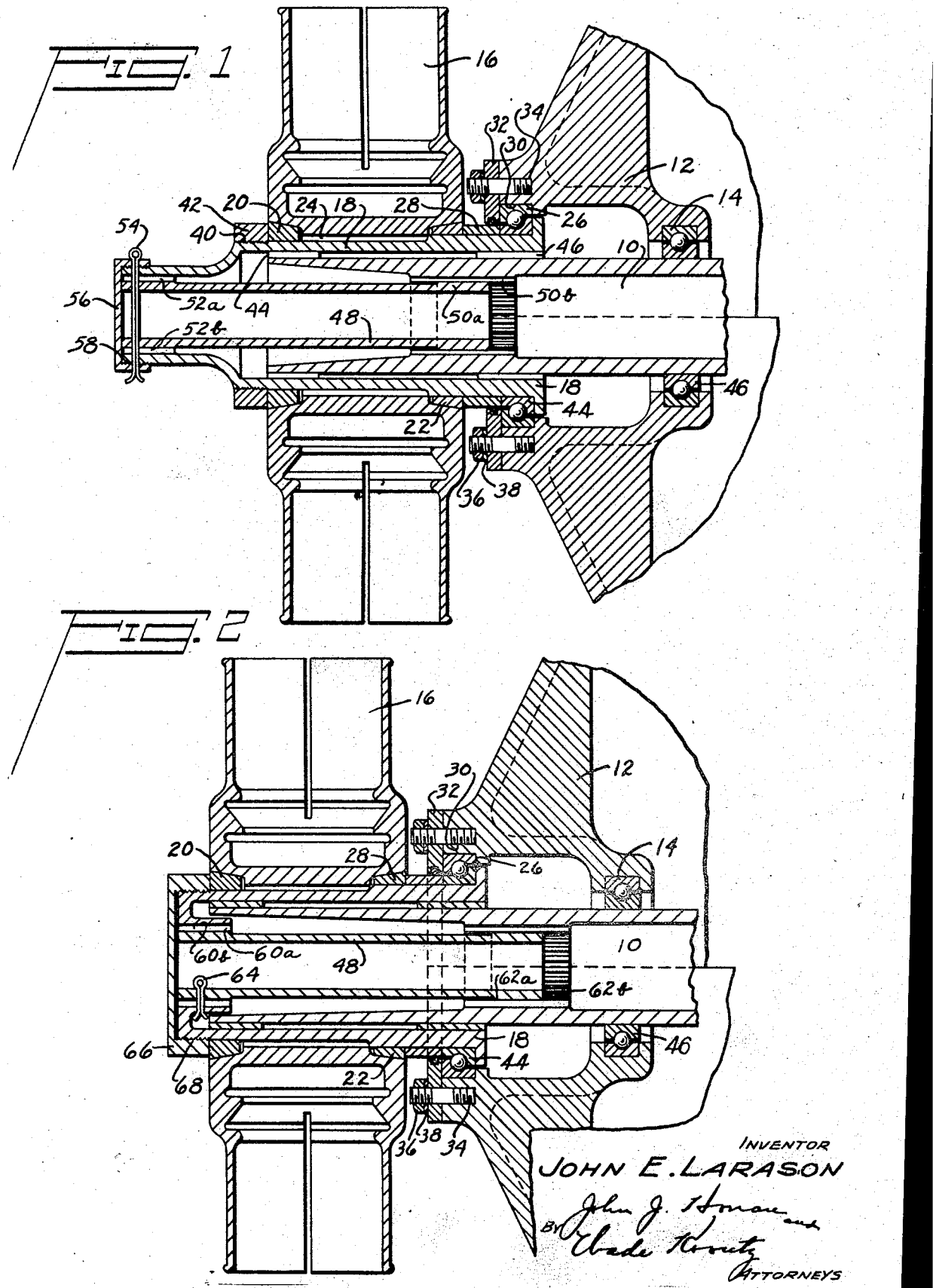

2,229,657

UNITED STATES PATENT OFFICE 2,229,657

POWER TRANSMISSION DEVICE

John E. Larason, Dayton, Ohio

Application May 29, 1937, Serial No. 145,485

9 Claims. (Cl. 170—177)

(Granted under the act of March 3, 1883, as amended April 30, 1928; 370 O. G. 757)

The invention described herein may be manufactured and used by or for the Government for governmental purposes, without the payment to me of any royalty thereon.

It is the customary practice to drive the propeller hub of an aircraft engine by a direct splined connection between the propeller hub and the engine crankshaft, correct alignment of hub and driving shaft being accomplished by means of two hub cones situated respectively at the front and rear faces of the propeller hub.

It has been found that if an aircraft propeller is mounted upon its driving shaft at some distance from the forward engine bearings, whip occurs owing to excessive overhang of the propeller relative to its nearest point of support. On the other hand, if the propeller is mounted close to the forward engine bearings, the aforementioned whip is greatly reduced but transmission of engine vibration to the propeller is greatly increased.

It is an object of the present invention to provide a flexible drive which is so constructed and arranged that the propeller hub is not directly connected to the engine crank shaft but rather is fixed to a hollow mounting sleeve freely journalled on the crankshaft, said mounting sleeve being connected to the engine crankshaft through a torsion driving connection, one end of which is connected to the mounting sleeve in the neighborhood of the front face of said propellor hub and the other end of which is connected to the crankshaft in the neighborhood of the rear face of said propeller hub.

A further object of my invention is to provide a hollow torsion shaft connected at front and rear extremities with said hollow mounting sleeve and said crankshaft, respectively, such that said hollow torsion shaft may be readily removed without necessitating the disassembly of the fixed propeller hub and mounting sleeve from the engine proper, thereby greatly facilitating substitution of alternate sleeves of different thickness and over-all lengths, if necessary, for obtaining a suitable angular displacement between propeller hub and engine crankshaft.

A still further object of my invention is to provide for ready removal of the completely assembled propeller hub, mounting sleeve and fixed hollow torsion sleeve from the forward face of the engine crank case through simple removal of a single thrust bearing retaining ring.

Other objects and advantages of my invention will become apparent from the following description taken in connection with the accompanying drawing, it being clearly understood that the same are by way of illustration and example only and are not to be taken as in any way limiting the spirit or scope of my invention. The spirit and scope of my invention is to be limited only by the prior art and by the terms of the appended claims.

Referring to the drawing, in which numerals of like character designate similar parts throughout the several claims:

Fig. 1 is a cross-sectional view of one embodiment of my invention; and

Fig. 2 is a cross-sectional view of another embodiment of my invention.

Referring to Fig. 1, a hollow crank shaft 10, of an internal combustion engine, is journaled to the two halves of a crank case 12 by means of a ball bearing 14. It will be noted that the forward end of the hollow crank shaft 10 extends well forward of the crank case 12 to terminate substantially in the front face of a split propeller hub 16. The hub 16 which, as illustrated, constitutes a support for the two blades (not shown) of the propeller is secured to the outer mid-portion of a propeller hub mounting sleeve 18 by means of a hub cone 20 in the front face of the hub, a hub cone 22 in the rear face of the hub, and a splined portion 24 therebetween. The aft end or rearwardly extending annular portion of the mounting sleeve 18 is provided with a combination thrust and journal bearing 26 and spacer sleeve 28 for journaled connection thereof to a recess 30 provided in the forward face of the crank case or engine housing 12. The mounting sleeve 18, and all parts hereinafter indicated as attached thereto, is held against axial (longitudinal) movement by means of a retaining ring 32 (with conventional oil retaining felt), studs 34, nuts 36, and lockwashers 38. The mounting sleeve 18 is further provided with threaded portion 40 and conventional retaining nut 42 whereby the hub 16 and parts associated therewith are completely assembled on the mounting sleeve 18. The aforesaid sub-assembly is rotatably journaled on the hollow crank shaft 10 by means of plane bearings 44 and 46.

So far, no driving connection has been provided between the propeller sub-assembly and the hollow crank shaft 10. In Fig. 1, I effect the aforesaid attachment by means of a hollow torsion shaft 48. It will be noted that the aft portion of the shaft 48 is externally splined at 50a for slidable engagement with internal splines 50b of the hollow crank shaft 10 at a position in the neighborhood of the rear face of the propeller hub 16, while the forward end thereof is similarly splined at 52a for slidable engagement with splines 52b of a necked-down portion of the mounting sleeve 18 forward of the front face of the propeller hub 16. It will be seen that I have provided for ready installation and removal of the hollow torsion shaft 48, or any substitute shaft therefor varying in wall thickness or over-all length, through simple removal or installation of a cotter pin 54 and a retainer cap 56 from a threaded portion 58 of the mounting sleeve 18 without removing the propeller sub-assembly from the engine crank shaft. This interchangeability makes possible infinite variations in torsional flexibility between propeller sub-assembly and engine crank shaft.

In the second embodiment of my invention, longitudinal placement of the bearings 14, 26, 44 and 46 remains unaltered, with reference to the crank case 12, as does forward extension of the hollow crank shaft 10 with reference to the forward face of the propeller hub 16. However, I have shortened the overall length of the propeller hub mounting sleeve 18 such that splined portions 60a and 60b lie substantially in the forward face of the propeller hub 16, while rear splined portions 62a and 62b, connecting the hollow crank shaft 10 and mounting sleeve 18, are aft of the rear face of the propeller hub 16. It will be further noted that the hollow torsion shaft 48 remains unaltered. The characteristics of length and wall thickness variation, as well as ready assembly by means of a cotter pin 64 and a combined retaining nut and cap 66 mounted on a threaded portion 68 of the propeller hub mounting sleeve 18, still remain the same as in the first embodiment of my invention. In both embodiments of my invention, it is at once evident that the entire propeller hub and torsion shaft assembly may be removed from the engine proper simply by removal of the retaining ring nuts 36. Thereafter, the gap existing between the recess 30 and the hollow crankshaft 10 would be sealed by a conventional dust cap in the event extended storage of the engine were contemplated. It should also be noted that the above embodiment of my invention is particularly desirable where it is necessary to use the space immediately in advance of the front face of a propeller hub for incorporation of an automatic or a controlled propeller pitch changing mechanisms.

Although the description is specific to the illustrations in the drawing, it is to be understood that there may be numerous departures therefrom which will still be within the field and scope of my invention, so that I do not wish to be restricted thereto, but only in so far as the appended claims are so limited.

What I claim is:

1. A propeller hub adapted to be drivingly connected with the engine crankshaft having a hollow end portion, comprising a blade support and a pair of tubular members connected together at one end thereof in the neighborhood of the front face of said hub and arranged in spaced relation to receive therebetween the hollow end portion of said crankshaft, the inner tubular member constituting a torsion tube that is positively drivingly connected with said crankshaft in the neighborhood of the rear face of the blade support, and the other tubular member being drivingly connected with said blade support and being rotatably mounted on said crankshaft and adapted to be freely rotatably connected with said crankshaft housing.

2. A propeller hub assembly for aircraft engines adapted to be drivingly connected with crank shaft, including a blade support, an annular portion extending rearward of said support and adapted to be rotatably mounted within the crank shaft housing and secured thereto against relative axial movement therebetween, and a readily removable torsion member having one end adapted to be slidably connected in positive driving relation with said crank shaft in the neighborhood of the rear face of said propeller hub and having its other end detachably connected to said hub at a position in the neighborhood of the front face thereof.

3. A flexible drive comprising in combination, an engine crank shaft, a housing forward of the main crank shaft housing surrounding said crank shaft in spaced relation thereto, and a hub rotatably mounted on said shaft, said hub having an annular portion axially arranged in coincidental relation with the axis of said crank shaft, torsion means connected to said hub at a position in the neighborhood of the front face thereof and drivingly axially slidably connected with said shaft, said annular portion of said hub being received by and rotatably mounted within said spaced housing and fixed thereto against axial movement.

4. A mechanism for driving an aircraft propeller from an engine developing a periodically varying torque comprising, an engine driving shaft having a hollow end portion, a propeller rotatably mounted on said shaft hollow portion, and a torsion member disposed within said hollow portion and drivingly connected at one end to said shaft at a position in the neighborhood of the rear face of the hub of said propeller and fixedly connected at the other end to said hub at a position in the neighborhood of the front face of said hub and means for retaining said torsion member and driving shaft in fixed driving relation.

5. A mechanism for driving an aircraft propeller from an engine developing a periodically varying torque comprising, a hollow driving member driven by said engine and rotatably mounted within the hub of said propeller, a hollow engine driving shaft, a propeller rotatably mounted on said shaft, and a torsion tubular member disposed within and detachably connected in axially slidable and positive driving relation at one end with the crank shaft at a position within the engine crank case and drivingly connected at the other end to said hub at a position in the neighborhood of the front face of said propeller.

6. An arrangement for driving a propeller hub from an engine shaft having a hollow end portion comprising, a housing for said shaft, a blade support having an annular portion rotatably mounted upon said shaft, a thrust bearing in said housing for supporting said annular portion against axial movement, and a torsion member axially slidably received within said hollow portion and drivingly connecting said shaft and said hub, the connection between the shaft and said torsion member being at a position in the neighborhood of said thrust bearing.

7. A propeller hub adapted to be drivingly connected with a hollow end portion of the driving shaft of an engine comprising, a housing for said shaft, a blade support adapted to be rotatably mounted on said shaft and to be connected in thrust bearing freely rotating relation with said housing and a torsion member adapted to be supported in and positively drivingly connected with said shaft in the neighborhood of the rear face of said hub and having its other end drivingly connected to said hub in a position in the neighborhood of the front face thereof.

8. A propeller hub adapted to be drivingly connected with a hollow end portion of the driving shaft of an engine comprising, means adapted for rotatably supporting said hub upon said shaft and for securing the same against relative axial movement thereon, and a torsion member adapted to be axially slidably mounted on and drivingly connected at one end with said driving shaft at a position in the neighborhood of the rear face of said hub and having its other end drivingly connected to said hub at a position in the neighborhood of the front face thereof.

9. A flexible drive comprising, in combination, a hollow driving member, a hub rotatably mounted on said driving member, a torsional member disposed within said hollow driving member and connected to said hub at a position in the neighborhood of the front face of the hub and drivingly connected with said driving member at a position in the neighborhood of the rear face of said hub.

JOHN E. LARASON.